(12) United States Patent
Yoshida et al.

(10) Patent No.: US 11,485,236 B2
(45) Date of Patent: Nov. 1, 2022

(54) VEHICLE

(71) Applicant: SUBARU CORPORATION, Tokyo (JP)

(72) Inventors: Kazuhiro Yoshida, Tokyo (JP); Satoshi Inoue, Tokyo (JP); Takuya Machida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 286 days.

(21) Appl. No.: 16/931,089

(22) Filed: Jul. 16, 2020

(65) Prior Publication Data

US 2021/0086626 A1 Mar. 25, 2021

(30) Foreign Application Priority Data

Sep. 25, 2019 (JP) .............................. JP2019-173943

(51) Int. Cl.
| | |
|---|---|
| *B60W 10/08* | (2006.01) |
| *B60L 15/20* | (2006.01) |
| *B60W 20/40* | (2016.01) |
| *B60W 20/11* | (2016.01) |
| *B60W 20/10* | (2016.01) |
| *B60W 10/06* | (2006.01) |

(52) U.S. Cl.
CPC ............ *B60L 15/20* (2013.01); *B60W 10/06* (2013.01); *B60W 10/08* (2013.01); *B60W 20/10* (2013.01); *B60W 20/11* (2016.01); *B60W 20/40* (2013.01); *B60L 2240/421* (2013.01); *B60L 2240/423* (2013.01); *B60W 2510/083* (2013.01); *B60W 2710/0666* (2013.01); *B60W 2710/083* (2013.01)

(58) Field of Classification Search
CPC ...... B60W 20/10; B60W 20/11; B60W 20/40; B60W 2510/083; B60W 10/06; B60W 10/08; B60W 2710/0666; B60W 2710/083; B60L 15/20; B60L 2240/423; B60L 2260/26; H02P 25/20
USPC ............................................................. 477/3
See application file for complete search history.

(56) References Cited

U.S. PATENT DOCUMENTS

| | | | | |
|---|---|---|---|---|
| 6,233,508 | B1 * | 5/2001 | Deguchi | B60L 50/15 |
| | | | | 180/65.23 |
| 2013/0332015 | A1 * | 12/2013 | Dextreit | B60K 6/48 |
| | | | | 180/65.23 |
| 2014/0074334 | A1 * | 3/2014 | Tagawa | B60K 6/365 |
| | | | | 180/65.265 |
| 2021/0254676 | A1 * | 8/2021 | Itasaka | B60W 20/40 |

FOREIGN PATENT DOCUMENTS

JP 2013-034317 A 2/2013

\* cited by examiner

*Primary Examiner* — Roger L Pang
(74) *Attorney, Agent, or Firm* — McDermott Will & Emery LLP

(57) ABSTRACT

A vehicle includes a motor, a second drive source, and a drive controller. The motor is a first drive source configured to drive wheels. The motor has a plurality of switchable modes that differ in at least one of a number of poles or a type of torque for rotating a rotor. The second drive source is configured to drive the wheels in parallel with the motor. The drive controller is configured to set, during switching of the modes, a target driving force of the second drive source to be larger than a target driving force of the second drive source before the switching of the modes.

5 Claims, 5 Drawing Sheets

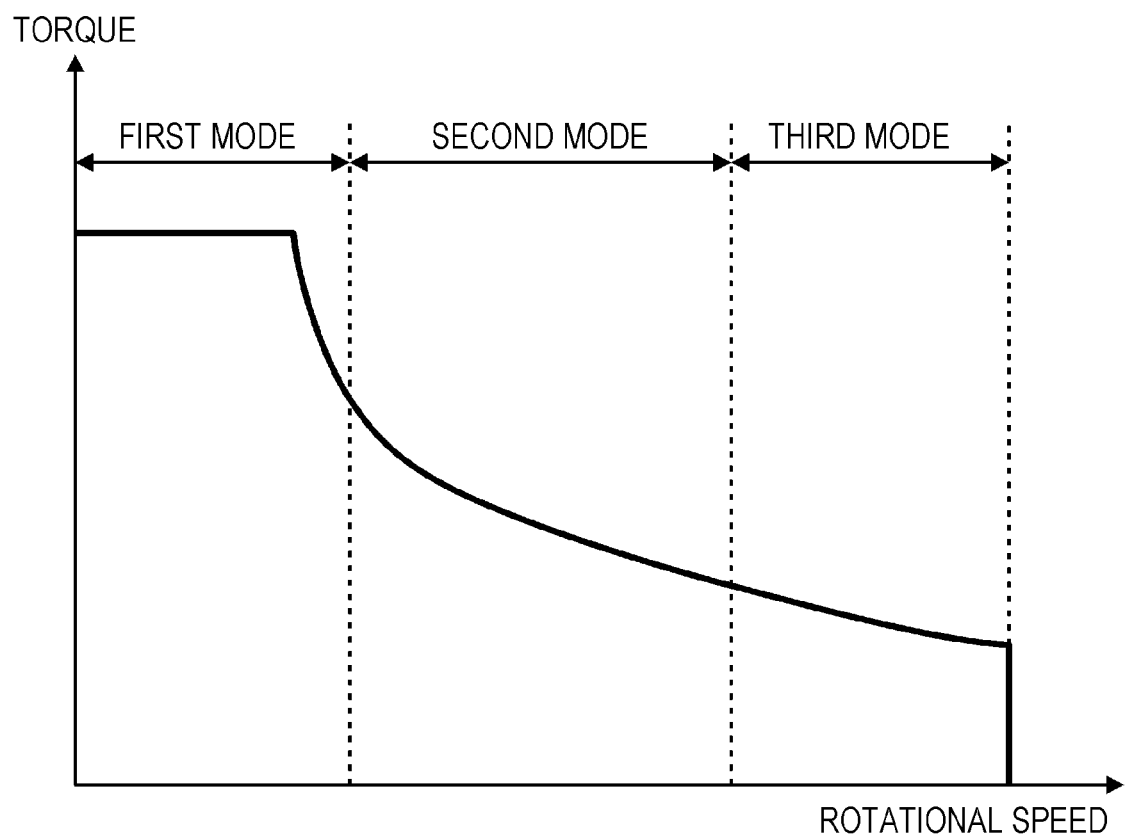

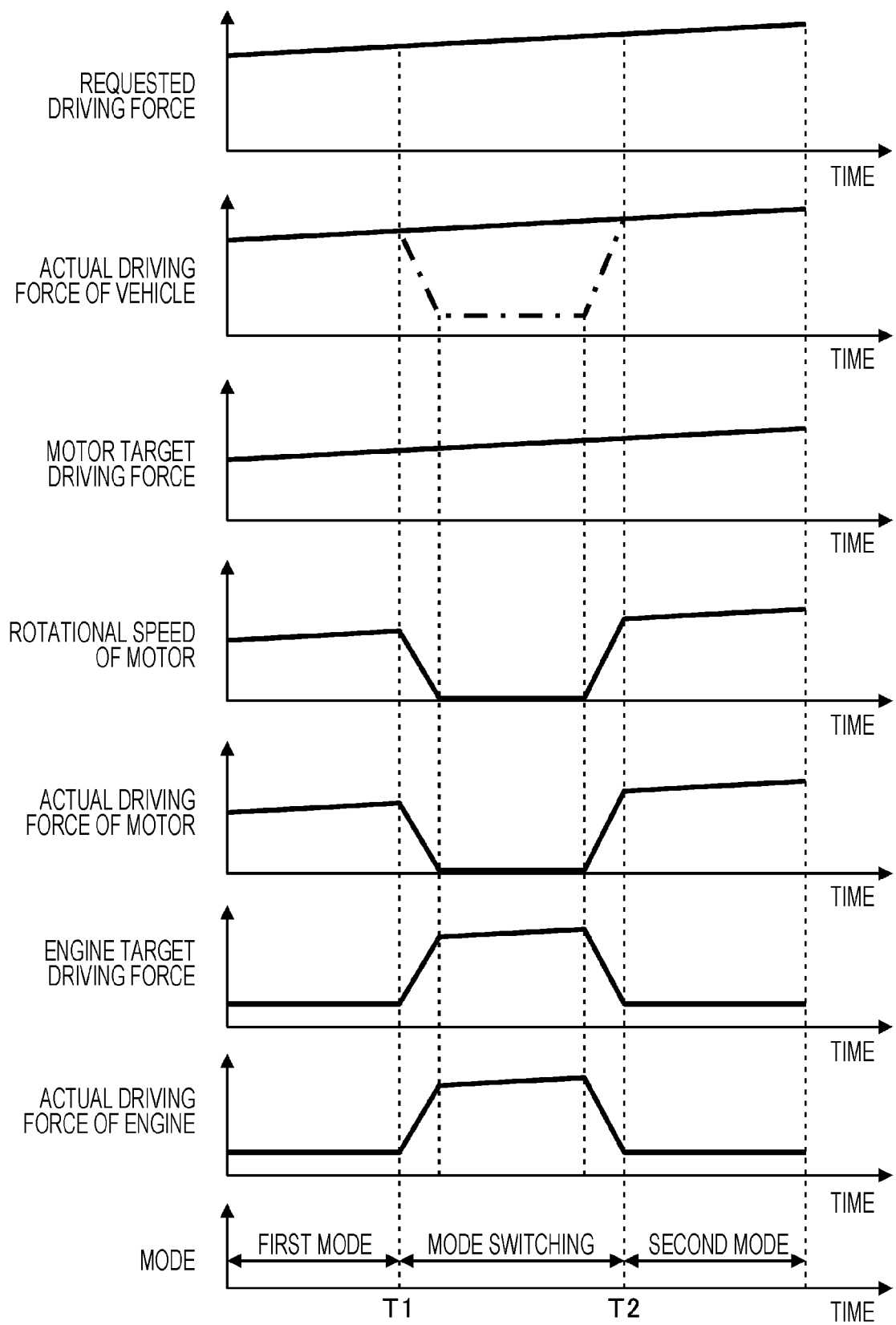

VEHICLE

CROSS-REFERENCE TO RELATED APPLICATIONS

The present application claims priority from Japanese Patent Application No. 2019-173943 filed on Sep. 25, 2019, the entire contents of which are hereby incorporated by reference.

BACKGROUND

The disclosure relates to a vehicle including a motor as a drive source.

Japanese Unexamined Patent Application Publication No. 2013-34317 discloses a motor with a variable number of poles.

SUMMARY

An aspect of the disclosure provides a vehicle including a motor, a second drive source, and a drive controller. The motor is a first drive source configured to drive wheels. The motor has a plurality of switchable modes that differ in at least one of a number of poles or a type of torque for rotating a rotor. The second drive source is configured to drive the wheels in parallel with the motor. The drive controller is configured to set, during switching of the modes, a target driving force of the second drive source to be larger than a target driving force of the second drive source before the switching of the modes.

An aspect of the disclosure provides a vehicle including a motor and circuitry. The motor has a plurality of modes that differ in at least one of a number of poles or a type of torque for rotating a rotor. The circuitry is configured to cause the motor to operate as a first drive source to drive wheels, cause the motor to switch the modes, cause a second drive source to drive the wheels in parallel with the motor, and set, during switching of the modes, a target driving force of the second drive source to be larger than a target driving force of the second drive source before the switching of the modes.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 4 is a diagram illustrating characteristics of the torque relative to the rotational speed of the motor;

FIG. 5 is a diagram illustrating driving forces when modes of the motor are switched.

DETAILED DESCRIPTION

In a motor with a variable number of poles, a predetermined time is taken from when the number of poles starts to be changed to when the number of poles is completely changed. During the change of the number of poles, the actual driving force of the motor decreases. A vehicle including the motor as an drive source has an actual driving force that may decrease during the change of the number of poles. A temporary decrease in the actual driving force of the vehicle generates shock during driving, which may make the driver feel uncomfortable.

It is desirable to provide a vehicle that can reduce the shock generated during driving.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
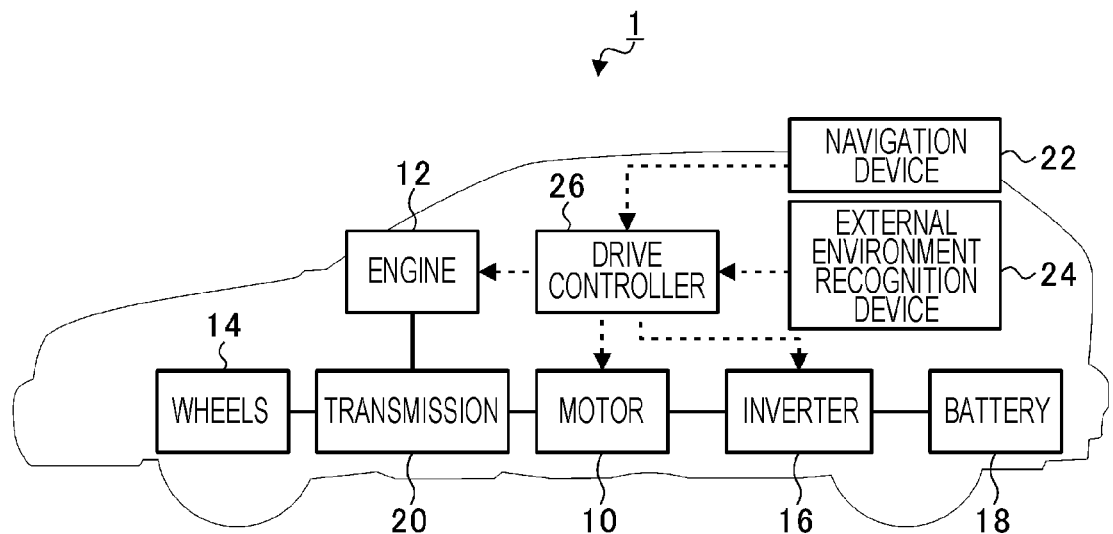
FIG. 1 is a schematic diagram illustrating a configuration of a vehicle according to an embodiment of the disclosure.

FIG. 1 is a schematic diagram illustrating a configuration of a vehicle 1 according to this embodiment. In the following, the configurations and processes related to this embodiment will be described in detail, whereas the configurations and processes not related to this embodiment will not be described.

The vehicle 1 includes a motor 10, an engine 12, wheels 14, an inverter 16, a battery 18, a transmission 20, a navigation device 22, an external environment recognition device 24, and a drive controller 26.

The vehicle 1 is a hybrid vehicle in which the motor 10 and the engine 12 are disposed in parallel. The motor 10 is a first drive source for driving the wheels 14, and the engine 12 is a second drive source for driving the wheels 14.

As described in detail below, the motor 10 has a plurality of modes that differ in at least one of the number of poles or the type of torque for rotating a rotor, and the modes are switchable.

The inverter 16 includes a plurality of switching elements that are bridge coupled together. The inverter 16 converts direct current (DC) power of the battery 18 to alternating current (AC) power by turning the switching elements on/off and supplies the AC power to the motor 10.

The motor 10 has a rotating shaft that is coupled to the wheels 14 via the transmission 20, such as a continuously variable transmission. The motor 10 consumes the power supplied thereto through the inverter 16 to rotate the rotating shaft. As the rotating shaft of the motor 10 rotates, the wheels 14 are driven through the transmission 20.

Examples of the engine 12 include a reciprocating engine. The engine 12 has an output shaft that is coupled to the transmission 20. The engine 12 consumes fuel such as gasoline to rotate the output shaft. As the output shaft of the engine 12 rotates, the wheels 14 are driven through the transmission 20.

The navigation device 22 is configured to communicate with a device outside the vehicle 1 and to obtain map information indicating a map or traffic information indicating traffic restrictions and the like. The navigation device 22 is also configured to obtain the current position of the vehicle 1 by using Global Positioning System (GPS) technology. The navigation device 22 has an input/output function such as a touch panel. For example, the navigation device 22 allows the driver to operate the touch panel to obtain the destination of the vehicle 1. The navigation device 22 can derive the travel route of the vehicle 1 from the current position of the vehicle 1, the destination, the map information, the traffic information, and so on.

The external environment recognition device 24 obtains an image captured by an image capturing device. The image capturing device captures an image of the scene ahead of the vehicle 1. The external environment recognition device 24 is configured to recognize various objects, such as a vehicle traveling ahead of the vehicle 1, the road on which the vehicle 1 is traveling, and a traffic light, based on the obtained image. The objects recognizable by the external environment recognition device 24 are not limited to those exemplarily presented herein.

The drive controller 26 is constituted by a semiconductor integrated circuit including a central processing unit (CPU), a read only memory (ROM) that stores a program and the like, and a random access memory (RAM) serving as a work area. The drive controller 26 executes the program to mainly control the driving of the wheels 14.

The drive controller 26 derives a requested driving force that is requested in accordance with the accelerator opening degree. The drive controller 26 derives a target driving force of the motor 10 (motor target driving force) and a target driving force of the engine 12 (engine target driving force) on the basis of the requested driving force. The drive controller 26 derives the motor target driving force and the engine target driving force so as to mainly make the total driving force, which is obtained by totaling the motor target driving force and the engine target driving force, equal to a requested driving force requested for the vehicle 1. The drive controller 26 controls the motor 10 so that the driving force of the motor 10 reaches the motor target driving force, and controls the engine 12 so that the driving force of the engine 12 reaches the engine target driving force.

The drive controller 26 may determine the ratio of the motor target driving force and the engine target driving force by referring to various kinds of information such as the speed of the vehicle 1, the acceleration of the vehicle 1, the travel route derived by the navigation device 22, and information on an external environment of the vehicle 1, which is recognized by the external environment recognition device 24.

Further, the drive controller 26 controls the motor 10 to switch modes of the motor 10 in accordance with a predetermined condition. The drive controller 26 will be described in detail below.

Figure 2:
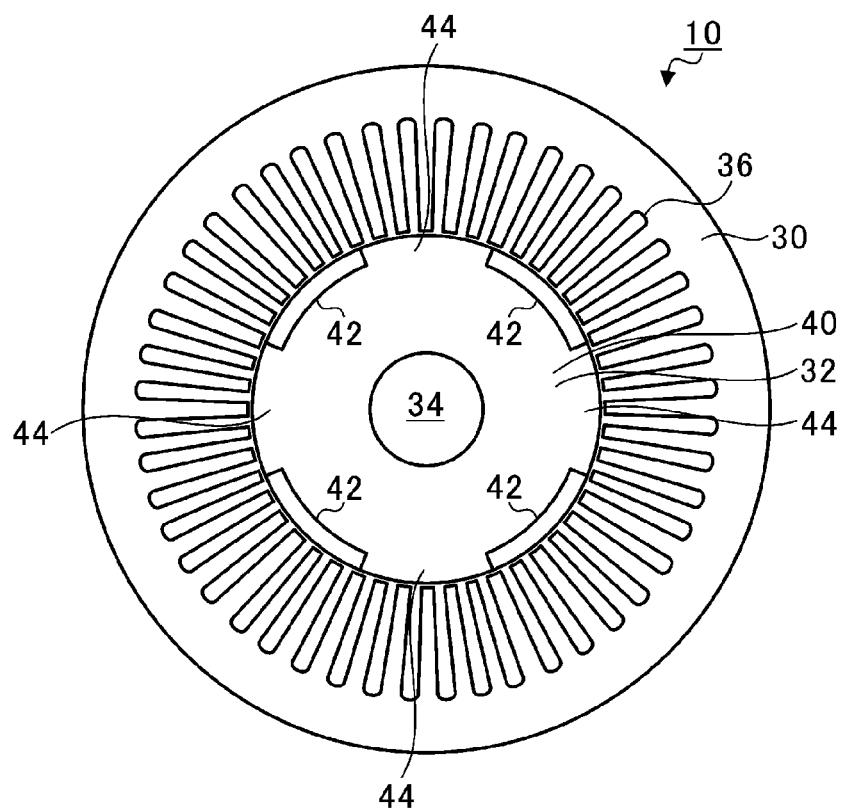
FIG. 2 is a cross-sectional view of a motor.

FIG. 2 is a cross-sectional view of the motor 10. The motor 10 has a stator 30, a rotor 32, and a rotating shaft 34. The stator 30 has a tubular shape. The stator 30 has a plurality of slots 36 in an inner surface thereof. Each of the slots 36 receives a stator winding. When three-phase AC current flows through the stator windings, a rotating magnetic field that rotates in the circumferential direction of the stator 30 can be generated. In FIG. 2, the stator windings are not illustrated.

The rotor 32 has a cylindrical shape. The rotor 32 is received in the stator 30 in such a manner that an outer circumferential surface of the rotor 32 faces the inner surface of the stator 30. The rotating shaft 34 is coaxially coupled to the rotor 32.

The rotor 32 includes a rotor iron core 40 and magnet members 42. The rotor iron core 40 is a main body of the rotor 32, which is made of iron and has a cylindrical shape.

The magnet members 42 are formed of a magnetic material. The rotor 32 has four magnet members 42, and the four magnet members 42 have the same shape. The magnet members 42 are shaped such that, for example, a circular tube is divided into eight pieces along the circumference thereof. The magnet members 42 are embedded in the outer circumferential surface of the rotor iron core 40. The magnet members 42 are disposed at equal intervals along the circumference of the rotor iron core 40. The magnet members 42 are spaced apart from each other along the circumference of the rotor iron core 40.

In this embodiment, four magnet members 42 are disposed. In some embodiments, two magnet members 42 may be disposed, or six or more magnet members 42, the number of which is an even number, may be disposed.

Portions of the rotor iron core 40 between adjacent magnet members 42, that is, portions of the rotor iron core 40 along the circumference thereof in which the magnet members 42 are not present, project in the radial direction outward compared with portions of the rotor iron core 40 where the magnet members 42 are present. The projecting portions are hereinafter referred to sometimes as salient pole members 44.

In the motor 10, the magnet members 42 can be magnetized to impart magnetism to the magnet members 42 to allow the magnet members 42 to function as magnets. For example, an exciting current that is twice or more the usual current that generates the rotating magnetic field can be caused to flow through the stator windings to magnetize the magnet members 42.

In the motor 10, furthermore, the magnet members 42 can be demagnetized to remove the magnetism of the magnet members 42. For example, an exciting current whose phase is opposite to the phase of the exciting current for the current magnetic poles can be caused to flow through the stator windings to demagnetize the magnet members 42.

In the motor 10, furthermore, the magnetic poles of the magnet members 42 can be reversed. For example, an exciting current whose phase is opposite to the phase of the exciting current for the current magnetic poles and which is twice or more the usual current that generates the rotating magnetic field can be caused to flow through the stator windings to reverse the magnetic poles of the magnet members 42.

The magnetic properties of the magnet members 42, which are magnetized, are maintained, like permanent magnets, until the magnet members 42 are demagnetized or until the magnetic poles are reversed. The magnet members 42, which are demagnetized, are maintained in such a manner that the magnetism is removed until the magnet members 42 are magnetized.

Figure 3A:
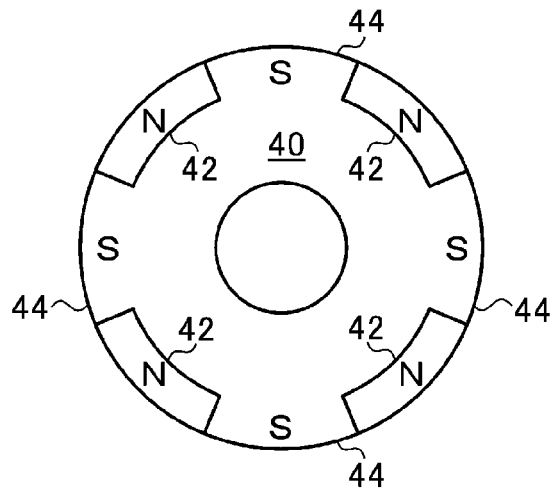
FIG. 3A illustrates a first mode of the motor.
Figure 3B:
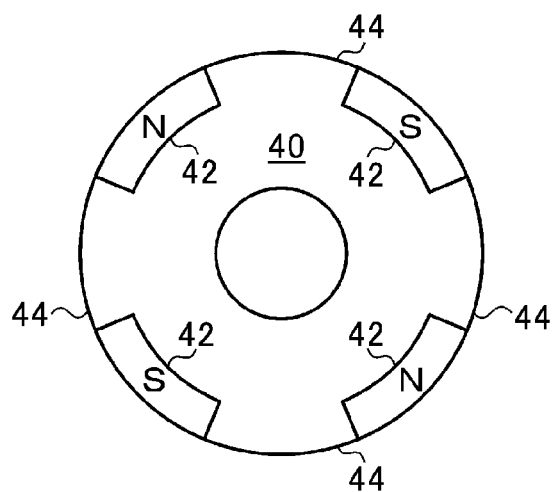
FIG. 3B illustrates a second mode of the motor.
Figure 3C:
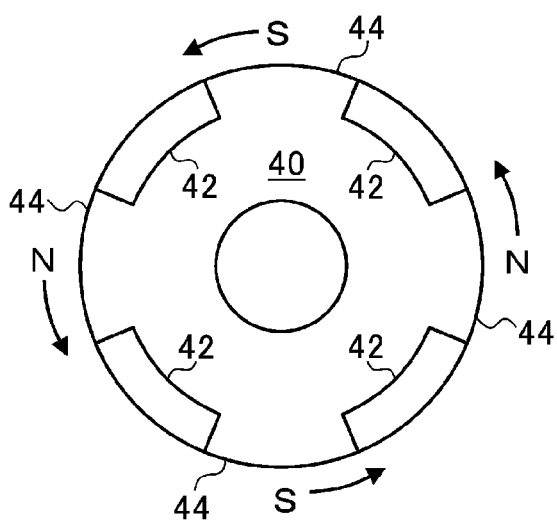
FIG. 3C illustrates a third mode of the motor.

FIGS. 3A to 3C are diagrams illustrating modes of the motor 10. The motor 10 has three modes, including a first mode, a second mode, and a third mode. FIG. 3A illustrates the first mode, FIG. 3B illustrates the second mode, and FIG. 3C illustrates the third mode. These modes of the motor 10 are switchable.

As illustrated in FIG. 3A, the first mode is a mode for causing all the magnet members 42 to function as magnets with the same kind of magnetic pole (e.g., N pole). The first mode is achieved by, for example, magnetizing all the four magnet members 42 to the same magnetic pole.

In the first mode, the salient pole members 44 between the magnet members 42 that are adjacent in the circumferential direction function as magnets with the magnetic pole (e.g., S pole) opposite to the magnetic pole of the magnet members 42. Accordingly, the rotor 32 has eight poles. In the first mode, because of the presence of a magnet with eight poles on a surface facing the rotating magnetic field, the torque for rotating the rotor 32 of the motor 10 is mainly a magnet torque for eight poles. That is, when the motor 10 having the four magnet members 42 is driven in the first mode, the motor 10 functions as a permanent magnet motor with eight poles.

As illustrated in FIG. 3B, the second mode is a mode for causing the magnet members 42 disposed in the circumferential direction to function as magnets whose magnetic poles are alternately reversed. The second mode is achieved by, for example, magnetizing the four magnet members 42 such that one of the magnet members 42 is magnetized to N pole, magnet members 42 adjacent to the magnet member 42 with N pole in the circumferential direction are magnetized to S pole, and a magnet member 42 facing the magnet member 42 with N pole is magnetized to N pole.

In the second mode, the salient pole members 44 between the magnet members 42 that are adjacent in the circumferential direction do not function as magnets. Accordingly, the rotor 32 has four poles. In the second mode, because of the presence of a magnet with four poles on a surface facing the rotating magnetic field, the torque for rotating the rotor 32 of the motor 10 is mainly a magnet torque for four poles. That is, when the motor 10 having the four magnet members 42 is driven in the second mode, the motor 10 functions as a permanent magnet motor with four poles.

In the second mode, furthermore, since the number of poles of the rotor 32 is half that in the first mode, the number of coils that generate the rotating magnetic field in the stator 30 is also set to half that in the first mode. Accordingly, for example, when the first mode is switched to the second mode, the coupling of the stator windings is also switched so that the number of coils is set to half that in the first mode.

As illustrated in FIG. 3C, the third mode is a mode for causing none of the magnet members 42 to function as a magnet. The third mode is achieved by, for example, demagnetizing all the four magnet members 42.

In the third mode, substantially no magnet is present on a surface facing the rotating magnetic field. In the third mode, therefore, no magnet torque is generated.

In the third mode, however, the four salient pole members 44 of the rotor 32 function as a portion of a magnetic circuit. For example, assuming a rotating magnetic field with four magnetic poles, the four salient pole members 44 of the rotor 32 are attracted to the rotating magnetic field and are rotated. Accordingly, the torque for rotating the rotor 32 of the motor 10 is mainly a reluctance torque for four poles. That is, when the motor 10 having the four magnet members 42 is driven in the third mode, the motor 10 functions as a reluctance motor with four poles.

In the third mode, furthermore, since the salient pole members 44 that generate the reluctance torque have four poles, the number of coils that generate the rotating magnetic field in the stator 30 may be equal to the number of coils in the second mode. Accordingly, when the second mode is switched to the third mode, the coupling of the stator windings in the second mode may be maintained.

FIG. 4 is a diagram illustrating characteristics of the torque relative to the rotational speed of the motor 10. As illustrated in FIG. 4, modes of the motor 10 are switched in accordance with the rotational speed. For example, the motor 10 is caused to operate in the first mode within a low-speed area where the rotational speed is low, to operate in the second mode within a middle-speed area where the rotational speed is intermediate, and to operate in the third mode within a high-speed area where the rotational speed is high.

As described above, in the first mode, the rotor 32 is mainly rotated by a magnet torque for eight poles, and thus the maximum value of the torque in the low-speed area is high. In the first mode, however, the degrease in torque becomes large as the rotational speed increases.

In the second mode, in contrast, the rotor 32 is mainly rotated by a magnet torque for four poles, and thus the maximum value of the torque in the low-speed area is lower than that in the first mode. In the second mode, however, the decrease in torque with an increase in rotational speed is smaller than that in the first mode.

Accordingly, the motor 10 is caused to operate in the first mode within the low-speed area where the torque in the first mode is higher than the torque in the second mode, and to operate in the second mode within the middle-speed area where the torque in the second mode is higher than the torque in the first mode.

In the third mode, the rotor 32 is mainly rotated by a reluctance torque for four poles, and thus the maximum value of the torque in the area less than or equal to the middle-speed area is lower than that in the second mode. In the third mode, however, the decrease in torque with an increase in rotational speed is smaller than that in the second mode.

Accordingly, the motor 10 is caused to operate in the second mode within the middle-speed area where the torque in the second mode is higher than the torque in the third mode, and to operate in the third mode within the high-speed area where the torque in the third mode is higher than the torque in the second mode.

As described above, the motor 10 is switchable among the first mode, the second mode, and the third mode, which differ in at least one of the number of poles or the type of torque, in accordance with the rotational speed. Accordingly, the motor 10 can have high torque across the low to high-speed areas.

FIG. 5 is a diagram illustrating driving forces when modes of the motor 10 are switched. In the embodiment illustrated in FIG. 5, it is assumed that the motor 10 is in the first mode prior to time T1 and that the mode of the motor 10 is switched to the second mode at time T2 subsequent to time T1. That is, the period from time T1 to time T2 is assumed to be a period during which mode switching occurs.

Prior to time T1, as the requested driving force progressively increases, the motor target driving force is assumed to progressively increase. Then, the rotational speed of the motor 10 also progressively increases. At time T1, the rotational speed of the motor 10 is assumed to exceed a rotational speed at the boundary between the first mode and the second mode. This rotational speed is referred to as a first boundary rotational speed.

In response to the rotational speed of the motor 10 exceeding the first boundary rotational speed, the drive controller 26 activates the inverter 16 to cause an exciting current for reversing the magnetic pole of some of the magnet members 42 to flow through the motor 10. Further, the drive controller 26 causes the motor 10 to switch the coupling of the stator windings.

A predetermined time (e.g., several seconds) is taken until the magnetic pole of the magnet members 42 is completely reversed and the motor 10 is ready to start operating in the second mode. In addition, for example, an increase in the flow of exciting current leads to a decrease in torque current, or switching the coupling of the stator windings results in a temporary decrease in the actual driving force of the motor 10 during mode switching. Accordingly, as indicated by a one-dot chain line in FIG. 5, the actual driving force of the vehicle 1 decreases with respect to the requested driving force during mode switching. The decrease in the actual driving force of the vehicle 1 generates shock during driving of the vehicle 1, which may make the driver feel uncomfortable.

Accordingly, during mode switching, the drive controller 26 sets the engine target driving force to be larger than the engine target driving force before mode switching. For example, the drive controller 26 sets the difference driving force between the requested driving force and the actual driving force of the motor 10 as the engine target driving force during mode switching.

For example, the drive controller 26 stores in advance a predicted value of the actual driving force of the motor 10 during mode switching in association with the motor target driving force, a boundary rotational speed for mode switching, and the like. Even during mode switching, the drive controller 26 derives the motor target driving force in accordance with the requested driving force.

During mode switching, the drive controller 26 predicts an actual driving force of the motor 10 during mode switching on the basis of the motor target driving force and the like. The drive controller 26 sets the difference driving force between the requested driving force for the vehicle 1 and the actual driving force of the motor 10 during mode switching as the engine target driving force during mode switching. The actual driving force of the engine 12 increases during mode switching in accordance with the engine target driving force. Thus, the decrease in the actual driving force of the motor 10 is compensated for by the actual driving force of the engine 12.

Accordingly, the vehicle 1 can suppress the decrease in the actual driving force of the vehicle 1 relative to the requested driving force during mode switching, suppressing generation of shock during driving and preventing the driver from feeling uncomfortable.

When mode switching is complete at time T2, the drive controller 26 finishes the prediction of the actual driving force of the motor 10. The control for deriving the engine target driving force, which is based on the actual driving force of the motor 10, is returned to control similar to the control before mode switching.

When modes of the motor 10 are switched, various energy losses occur. Examples of the various energy losses include power consumption caused by an exciting current for magnetizing the magnet members 42, demagnetizing the magnet members 42, and reversing the magnetic poles, power consumption caused by a switch for switching the coupling of the stator windings, fuel consumption caused by the increase in the actual driving force of the engine 12, and hydraulic pressure loss in the transmission 20 caused by the increase in the actual driving force of the engine 12. The various energy losses are not limited to those exemplarily presented herein.

For example, if the rotational speed of the motor 10 is kept around the first boundary rotational speed, mode switching may be performed frequently. In this case, each time mode switching occurs, the energy losses described above are generated, resulting in an increase in energy loss.

Accordingly, the drive controller 26 estimates a future requested driving force over a predetermined amount of time ahead of the present time. For example, the drive controller 26 obtains the travel route and the like from the navigation device 22, and obtains the color of a traffic light, judgment of traffic congestion, the slope of the road, and the like from the external environment recognition device 24. The drive controller 26 estimates the future requested driving force by totaling these various kinds of information. The predetermined amount of time is may be for example, 10 seconds, but is not limited to this.

Thereafter, the drive controller 26 derives (an estimate) of the total energy loss estimated to be generated over the predetermined amount of time ahead of the present time on the basis of the estimated future requested driving force. The drive controller 26 derives the total energy loss for both cases with and without mode switching such that in one case, modes are switched immediately after the present time and in the other case, the current mode is maintained without switching modes.

Hereafter, the total energy loss over the predetermined amount of time ahead of the present time, which is determined assuming that the current mode is maintained, is sometimes referred to as maintenance loss. The total energy loss over the predetermined amount of time ahead of the present time, which is determined assuming that modes are switched immediately after the present time, is sometimes referred to as switching loss. The drive controller 26 derives the switching loss such that the switching loss includes the energy losses generated by the switching of the modes described above, such as losses generated by magnetization.

When the switching loss is smaller than the maintenance loss, the drive controller 26 causes the modes to be switched. When the switching loss is greater than or equal to the maintenance loss, the drive controller 26 causes the current mode to be maintained without switching the modes.

Accordingly, in the vehicle 1, even when the rotational speed of the motor 10 exceeds the first boundary rotational speed, the current mode is maintained without switching modes if the switching loss is larger than the maintenance loss. This prevents frequent mode switching even if the rotational speed of the motor 10 is kept around the first boundary rotational speed. The energy loss of the vehicle 1 can be suppressed.

Figure 6:
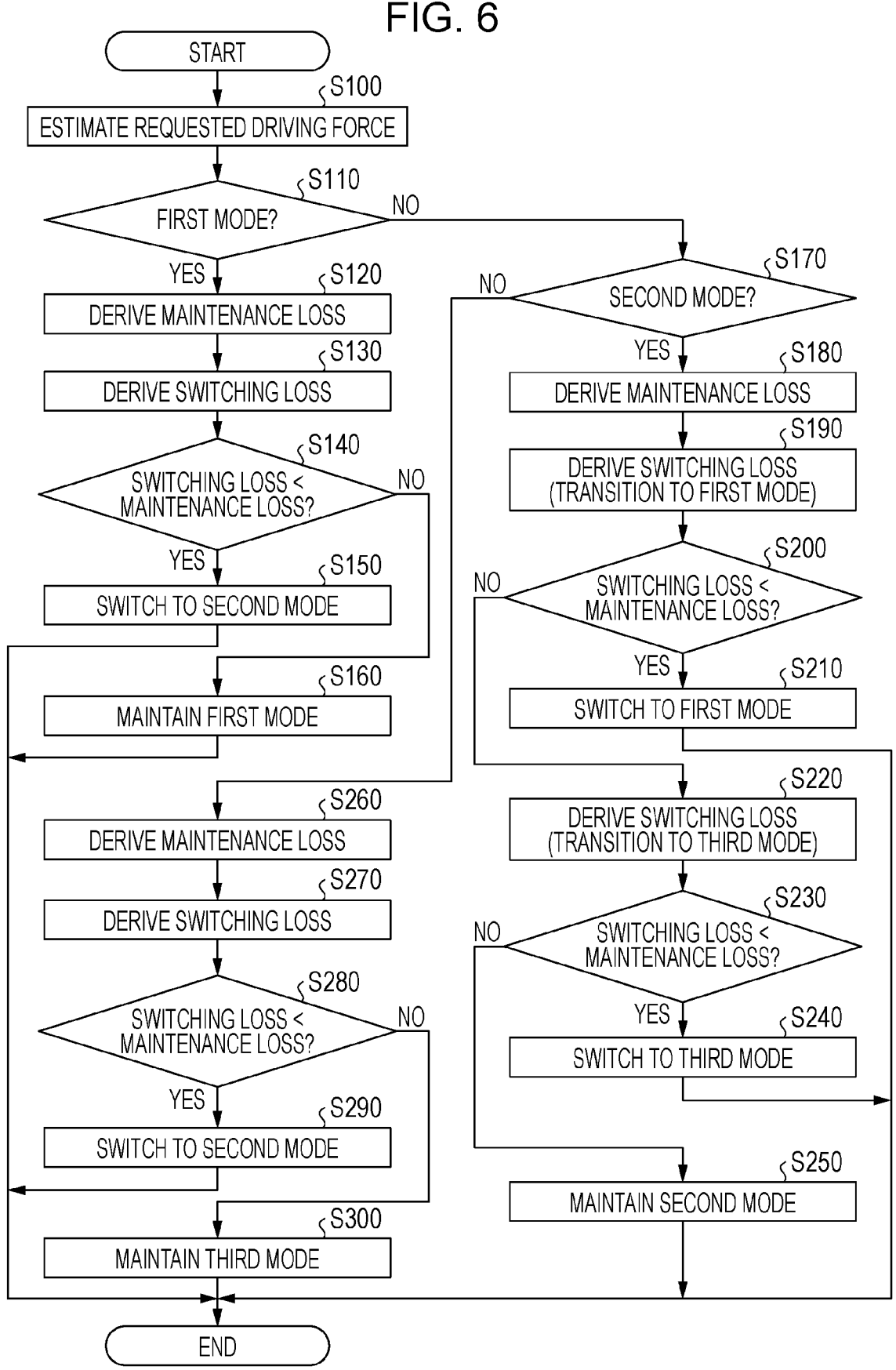
FIG. 6 is a flowchart illustrating a process for mode switching.

FIG. 6 is a flowchart illustrating a process for mode switching. The drive controller 26 repeatedly performs a series of processing operations illustrated in FIG. 6 at each interrupt timing. The interrupt timing occurs at intervals of a predetermined control period. In some embodiments, the series of processing operations may be performed at a timing other than at each predetermined interrupt timing. The drive controller 26 may perform the series of processing operations at the timing when the requested driving force is changed, or at the timing when the rotational speed of the motor 10 reaches around the first boundary rotational speed.

First, the drive controller 26 estimates a requested driving force over a predetermined amount of time ahead of the present time (S100). For example, the drive controller 26 estimates the requested driving force by totaling the travel route obtained from the navigation device 22 and various kinds of information on an external environment of the vehicle 1 obtained from the external environment recognition device 24.

Then, the drive controller 26 determines whether the current mode of the motor 10 is the first mode (S110). If the current mode of the motor 10 is the first mode (YES in S110), the drive controller 26 derives the maintenance loss (S120), and derives the switching loss (S130). The switching loss corresponds to that generated by the transition to the second mode.

Then, the drive controller 26 determines whether the switching loss is smaller than the maintenance loss (S140).

If the switching loss is smaller than the maintenance loss (YES in S140), the drive controller 26 causes the motor 10 to switch its mode to the second mode (S150). Then, the series of processing operations ends.

If the switching loss is greater than or equal to the maintenance loss (NO in S140), the drive controller 26 causes the motor 10 to maintain the current, first mode (S160). Then, the series of processing operations ends.

If the current mode of the motor 10 is not the first mode (NO in S110), the drive controller 26 determines whether the current mode of the motor 10 is the second mode (S170). If the current mode of the motor 10 is the second mode (YES in S170), the drive controller 26 derives the maintenance loss (S180), and derives the switching loss (S190). The switching loss corresponds to that generated by the transition to the first mode.

Then, the drive controller 26 determines whether the switching loss is smaller than the maintenance loss (S200).

If the switching loss is smaller than the maintenance loss (YES in S200), the drive controller 26 causes the motor 10 to switch its mode to the first mode (S210). Then, the series of processing operations ends.

If the switching loss is greater than or equal to the maintenance loss (NO in S200), the drive controller 26 derives the switching loss (S220). The switching loss corresponds to that generated by the transition to the third mode.

Then, the drive controller 26 determines whether the switching loss is smaller than the maintenance loss (S230).

If the switching loss is smaller than the maintenance loss (YES in S230), the drive controller 26 causes the motor 10 to switch its mode to the third mode (S240). Then, the series of processing operations ends.

If the switching loss is greater than or equal to the maintenance loss (NO in S230), the drive controller 26 causes the motor 10 to maintain the current, second mode (S250). Then, the series of processing operations ends.

If the current mode of the motor 10 is not the second mode (NO in S170), the drive controller 26 derives the maintenance loss (S260), and derives the switching loss (S270). The switching loss corresponds to that generated by the transition to the second mode.

Then, the drive controller 26 determines whether the switching loss is smaller than the maintenance loss (S280).

If the switching loss is smaller than the maintenance loss (YES in S280), the drive controller 26 causes the motor 10 to switch its mode to the second mode (S290). Then, the series of processing operations ends.

If the switching loss is greater than or equal to the maintenance loss (NO in S280), the drive controller 26 causes the motor 10 to maintain the current, third mode (S300). Then, the series of processing operations ends.

As described above, the vehicle 1 according to this embodiment includes the motor 10 having a plurality of switchable modes that differ in at least one of the number of poles or the type of torque for rotating the rotor 32. The drive controller 26 of the vehicle 1 according to this embodiment sets a target driving force of a second drive source (e.g., the engine 12) during switching of the modes of the motor 10 to be larger than a target driving force of the second drive source before the switching of the modes. This enables the vehicle 1 according to this embodiment to suppress the decrease in the actual driving force of the vehicle 1 even if the actual driving force of the motor 10 decreases during switching of the modes of the motor 10.

Therefore, the vehicle 1 according to this embodiment can reduce the shock generated during driving.

Further, the drive controller 26 of the vehicle 1 according to this embodiment sets a total driving force obtained by totaling the motor target driving force and the engine target driving force to be equal to the requested driving force, and sets the difference driving force between the requested driving force and the actual driving force of the motor during the switching of the modes as the engine target driving force during the switching of the modes, regardless of the total driving force. This enables the vehicle 1 according to this embodiment to obtain the actual driving force of the vehicle 1, which satisfies the requested driving force.

Further, the drive controller 26 of the vehicle 1 according to this embodiment causes the motor to switch the modes if a switching loss is smaller than a maintenance loss, and causes the motor to maintain the current mode if the switching loss is greater than or equal to the maintenance loss, the switching loss being an energy loss of the vehicle 1 determined assuming that the modes are switched, the maintenance loss being an energy loss of the vehicle 1 determined assuming that the current mode is maintained without switching of the modes. This enables the vehicle 1 according to this embodiment to keep the energy consumption of the vehicle 1 low even if the vehicle 1 includes the motor 10 with a variable number of poles as a drive source.

For example, in a situation where after the first mode is switched to the second mode, the rotational speed of the motor 10 is reduced and the second mode is returned to the first mode, due to the generation of energy losses when the mode of the motor 10 is returned from the second mode to the first mode, the second mode is maintained until the switching loss becomes smaller than the maintenance loss. That is, in the vehicle 1 according to this embodiment, hysteresis is used to determine whether to switch modes in accordance with the rotational speed of the motor 10. This can avoid frequent mode switching in the vehicle 1 according to this embodiment.

While an embodiment of the disclosure has been described with reference to the accompanying drawings, it goes without saying that the disclosure is not limited to the embodiment. It is to be understood that a person skilled in the art can make various changes or modifications within the scope as defined in the appended claims and that such changes or modifications also fall within the technical scope of the disclosure.

In the embodiment described above, the engine 12 is disposed as a second drive source. In some embodiments, the vehicle 1 may include, as the second drive source, a motor different from the first drive source.

The drive controller 26 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the drive controller 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising:
a motor serving as a first drive source configured to drive wheels, the motor having a plurality of switchable modes that differ in at least one of a number of poles or a type of torque for rotating a rotor;
a second drive source configured to drive the wheels in parallel with the motor; and
a drive controller configured to set, during switching of the modes, a target driving force of the second drive source to be larger than a target driving force of the second drive source before the switching of the modes.

2. The vehicle according to claim 1, wherein
the drive controller is configured to
set a total driving force to be equal to a requested driving force requested for the vehicle, the total driving force being obtained by totaling a target driving force of the motor and a target driving force of the second drive source, and
set a difference driving force between the requested driving force and an actual driving force of the motor during the switching of the modes as the target driving force of the second drive source during the switching of the modes, regardless of the total driving force.

3. The vehicle according to claim 1, wherein
the drive controller is configured to
cause the motor to switch the modes when a switching loss is smaller than a maintenance loss, and
cause the motor to maintain a current mode of the motor when the switching loss is greater than or equal to the maintenance loss,
the switching loss being an energy loss of the vehicle determined assuming that the modes are switched, the maintenance loss being an energy loss of the vehicle determined assuming that the current mode is maintained without switching of the modes.

4. The vehicle according to claim 2, wherein
the drive controller is configured to
cause the motor to switch the modes when a switching loss is smaller than a maintenance loss, and
cause the motor to maintain a current mode of the motor when the switching loss is greater than or equal to the maintenance loss,
the switching loss being an energy loss of the vehicle determined assuming that the modes are switched, the maintenance loss being an energy loss of the vehicle determined assuming that the current mode is maintained without switching of the modes.

5. A vehicle comprising:
a motor having a plurality of modes that differ in at least one of a number of poles or a type of torque for rotating a rotor; and
circuitry configured to
cause the motor to operate as a first drive source to drive wheels,
cause the motor to switch the modes,
cause a second drive source to drive the wheels in parallel with the motor, and
set, during switching of the modes, a target driving force of the second drive source to be larger than a target driving force of the second drive source before the switching of the modes.

* * * * *